United States Patent [19]
Yoshida et al.

[11] Patent Number: 5,439,517
[45] Date of Patent: Aug. 8, 1995

[54] BLACK INK COMPOSITION EXCELLENT IN BLACK

[75] Inventors: Miharu Yoshida; Hiroko Hayashi, both of Suwa, Japan

[73] Assignee: Seiko Epson Corporation, Tokyo, Japan

[21] Appl. No.: 149,298

[22] Filed: Nov. 9, 1993

[30] Foreign Application Priority Data

| Nov. 9, 1992 | [JP] | Japan | 4-298856 |
| Feb. 24, 1993 | [JP] | Japan | 5-035723 |
| Feb. 24, 1993 | [JP] | Japan | 5-035724 |
| Feb. 24, 1993 | [JP] | Japan | 5-035725 |
| May 6, 1993 | [JP] | Japan | 5-105579 |

[51] Int. Cl.$^6$ ............................. C09D 11/02
[52] U.S. Cl. ................. 106/22 K; 106/20 D
[58] Field of Search .............. 106/22 K, 20 D; 534/797, 822, 823, 824, 840, 841, 842, 846

[56] References Cited

U.S. PATENT DOCUMENTS

| 4,626,284 | 12/1986 | Ohta et al. | 106/22 K |
| 4,725,337 | 6/1988 | Kunde | 106/22 K |
| 4,963,189 | 10/1990 | Hindagolla | 106/22 K |
| 5,062,893 | 11/1991 | Adamic et al. | 106/22 K |
| 5,177,195 | 1/1993 | Gregory et al. | 106/22 K |
| 5,203,912 | 4/1993 | Greenwood et al. | 106/22 K |
| 5,268,459 | 12/1993 | Gregory et al. | 106/22 K |
| 5,281,263 | 1/1994 | Gregory et al. | 106/22 K |

FOREIGN PATENT DOCUMENTS

| 0168961 | 1/1986 | European Pat. Off. |
| 0359376 | 3/1990 | European Pat. Off. |
| 0494523 | 7/1992 | European Pat. Off. |

*Primary Examiner*—Helene Klemanski
*Attorney, Agent, or Firm*—Ladas & Parry

[57] ABSTRACT

An ink composition excellent in blackness and storage stability is disclosed which comprises a first dye represented by the following general formula (I) and a second dye selected from the group consisting of C.I. Direct Yellow 86, 132 and 144 and compounds represented by the following general formulae (II) and (III):

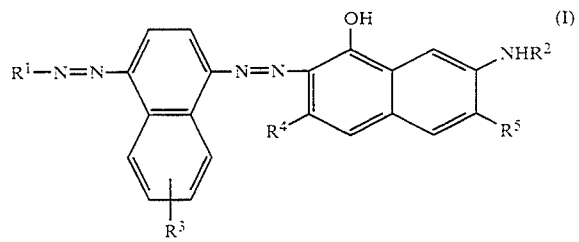

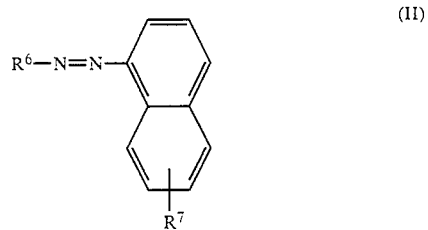

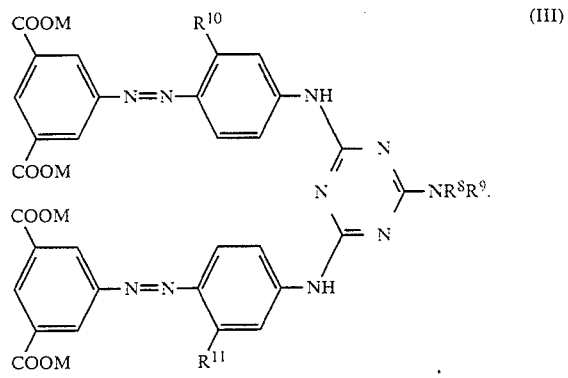

12 Claims, No Drawings

BLACK INK COMPOSITION EXCELLENT IN BLACK

BACKGROUND OF THE INVENTION

1. Field of the Invention

The present invention relates to an ink composition excellent in blackness and an ink jet recording method using the same.

2. Background Art

A black ink is an important ink composition used as an ink jet recording ink composition for both monocolor and full color printings.

C.I. Food Black 2 (Japanese Patent Laid-Open No. 93766/1984) and dyes having structures analogous thereto (Japanese Patent Laid-Open No. 91577/1991) have been widely used as dyes for the black ink.

These dyes, however, have a somewhat bluish hue that is more or less different from pure black (a black color perceived, for example, from Chinese ink (sumi) or Japanese lacquer (urushi)).

For this reason, a proposal has been made on the use of a combination of these dyes with other dyes for the purpose of improving the hue (Japanese Patent Laid-Open No. 36279/1990). However, it has been found that the combination of dyes deteriorates the storage stability of the ink. Furthermore, the use of such an ink in ink jet printers, which effect printing at a high density of 300 dpi or more and a high frequency of 5 kHz or more, often gives rise to lack of jetting stability and clogging of nozzles. A special recording material (for example, coat paper comprising a substrate sheet, such as paper, an ink receiving layer containing a pigment and binder) has been proposed for the purpose of enhancing the image quality. Although the coat paper can provide pure black, it is desired that blackness and sharpness of an image will be also performed on plain paper.

In a water-base ink using a water-soluble dye, a general problem is to improve the water resistance of the print (for example, Japanese Patent Laid-Open Nos. 91577/1991, 226175/1992 and 233975/1992). The ink composition described in these Japanese Patent Laid-Open No. 36279/1990 also leaves room for an improvement in the water resistance of the print.

Additional properties which are generally required of ink compositions for an ink jet recording method are that the ink does not clog jetting nozzles, printing can be quickly resumed even though clogging occurred, and ink properties remain unchanged during storage. Therefore, the ink compositions for ink jet recording should satisfy requirements of freedom from clogging of nozzles, quick resumption of printing after clogging of nozzles and excellent storage stability in addition to pure black color and water resistance.

SUMMARY OF THE INVENTION

Accordingly, an object of the present invention is to provide an ink composition excellent in blackness and storage stability and an ink jet recording method using the same.

Another object of the present invention is to provide an ink composition excellent in blackness even on plain paper and forming a sharp image and an ink jet recording method using the same.

A further object of the present invention is to provide an ink composition capable of satisfying requirements of not only water resistance but also various properties required of ink compositions for ink jet recording, for example, no clogging of nozzles and excellent storage stability.

The present inventors have found that a combination of two dyes having a particular structure can provide an ink composition excellent in blackness, resumption of printing after clogging and storage stability.

The ink composition according to the present invention comprises a first dye represented by the general formula (I):

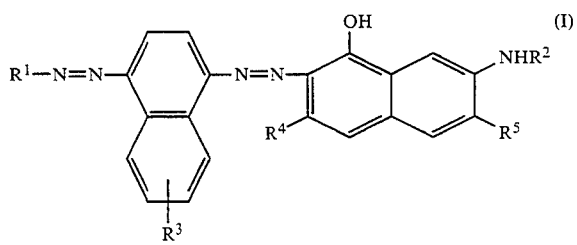

wherein
R$^1$ represents a phenyl or naphthyl group which may be substituted by a hydroxyl group, —NH$_2$, —SO$_3$M or —COOM wherein M represents a hydrogen atom or a cation species derived from an alkali metal, ammonia or an amine, R$^2$ represents a carboxyalkyl group wherein the carboxy group may form a salt with an alkali metal or ammonia, a substituted or unsubstituted alkoxyalkyl group or a substituted or unsubstituted phenyl or alkanoyl group, and R$^3$, R$^4$ and R$^5$, which may be the same or different, each independently represent a hydrogen atom or —SO$_3$M wherein M is as defined above, provided that R$^1$ does not represent a phenyl group substituted with —SO$_3$M when R$^3$, R$^4$ and R$^5$ all represent —SO$_3$M;

and a second dye selected from the group consisting of C.I. Direct Yellow 86, 132 and 144 and compounds represented by formula (II):

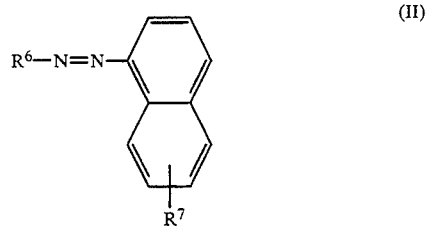

wherein
R$^6$ represents a phenyl or naphthyl group which may be substituted by a hydroxyl group, —NH$_2$, —SO$_3$M or —COOM wherein M represents a hydrogen atom or a cation species derived from an alkali metal, ammonia or an amine, and R$^7$ represents a hydrogen atom or —SO$_3$M wherein M is as defined above; or formula (III):

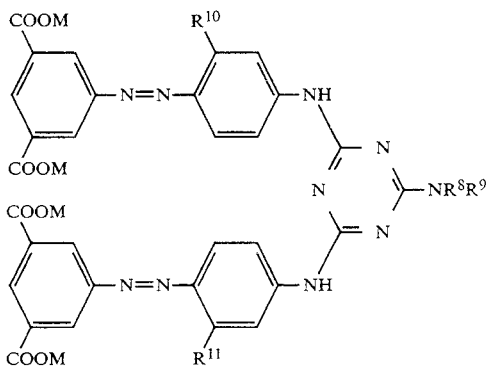

(III)

wherein

R[8] and R[9], which may be the same or different, each independently represent a hydrogen atom, an alkyl group or a hydroxyalkyl group, provided that R[8] and R[9] do not simultaneously represent a hydrogen atom, and R[10] and R[11], which may be the same or different, each independently represent a hydrogen atom, an alkyl group, a hydroxyalkyl group or an alkoxy group.

DETAILED DESCRIPTION OF THE INVENTION

First Dye

The first dye used in the ink composition according to the present invention is a compound represented by the general formula (I). The compound represented by the general formula (I) is a dye that, as such, may be used as a dye for a black ink. In the present invention, it is added in combination with dyes, which will be described below, to provide an ink composition.

In the general formula (I), the phenyl group or naphthyl group as the R[1] may be unsubstituted or substituted. When the R[1] represents a substituted phenyl group, a monosubstituted (preferably 3- or 4-substituted) phenyl group or a disubstituted (preferably 2,4-disubstituted or 3,5-disubstituted) phenyl group.

Preferred examples of the substituent include a hydroxyl group, —NH$_2$, a sulfonic group and a carboxy group. The sulfonic group and carboxy group may be in the form of a free acid or a salt. Preferred examples of the salt include salts of sulfonic acid and carboxylic acid with an alkali metal, ammonia or amine (preferably tri(hydroxy C$_{1-6}$ alkyl)amine).

The naphthyl group as the R[1] may be 1- or 2-naphthyl and unsubstituted or substituted. When the R[1] represents a substituted naphthyl, preferred examples of the substituent include those described above in connection with the phenyl group.

In the general formula (I), the carboxyalkyl group as the R[2] is preferably a carboxyC$_{1-6}$alkyl group, still preferably a carboxy C$_{1-4}$alkyl group. The carboxy group preferably combines with an alkali metal or ammonia to form a salt. The alkoxyalkyl group as the R[2] is preferably a C$_{1-6}$alkoxyC$_{1-6}$alkyl group, still preferably C$_{1-4}$alkoxyC$_{1-4}$alkyl group. One or more hydrogen atoms present in the alkoxyalkyl group may be substituted, and preferred examples of the substituent include a hydroxyl group and —NH$_2$. The phenyl group as the R[2] may be substituted, and preferred examples of the substituent include a hydroxyl group and —NH$_2$. The alkanoyl group as the R[2] is preferably a C$_{1-6}$ alkanoyl group, still preferably C$_{1-4}$ alkanoyl group.

In the general formula (I), the R[3], R[4] and R[5] may be the same or different and each independently represent a hydrogen atom or a sulfonic group. The sulfonic group may be in the form of a free acid or a salt. Preferred examples of the salt include salts of sulfonic acid with an alkali metal, ammonia or amine (preferably tri(hydroxy C$_{1-6}$ alkyl)amine).

It is noted that compounds represented by the general formula (I) wherein R[1] represents a phenyl group substituted with —SO$_3$M and R[3], R[4] and R[5] all represent —SO$_3$M cannot be utilized in the ink composition of the present invention. This is because experiments conducted by the present inventors have revealed that these compounds do not exhibit favorable properties.

Specific preferred examples of the compound represented by the general formula (I) are as follows.

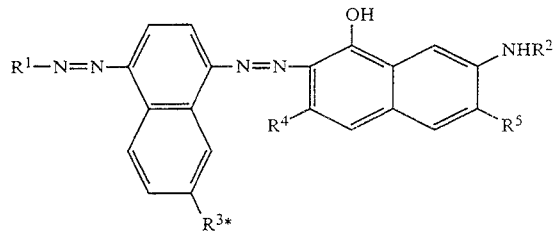

| Compound No. | R[1] | R[2] | R[3]* | R[4] | R[5] |
| --- | --- | --- | --- | --- | --- |
| 1 | NaO$_3$S—C$_6$H$_4$— | H | H | —SO$_3$Na | —SO$_3$Na |
| 2 | COOLi-C$_6$H$_4$— | —CH$_2$COOLi | —SO$_3$Li | —SO$_3$Li | H |

-continued

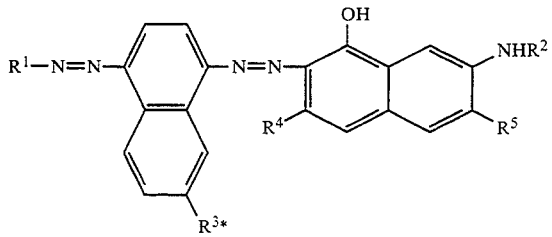

| Compound No. | R¹ | R² | R³* | R⁴ | R⁵ |
|---|---|---|---|---|---|
| 3 | phenyl | —COCH$_3$ | —SO$_3$Na | —SO$_3$Na | —SO$_3$Na |
| 4 | 3-(COONH$_4$)phenyl | —CH$_2$CH(OH)CH$_2$OC$_4$H$_9$ | —SO$_3$NH$_4$ | —SO$_3$NH$_4$ | H |
| 5 | 3-(COONH$_4$)phenyl | H | —SO$_3$NH$_4$ | —SO$_3$NH$_4$ | H |
| 6 | 4-(COONa)phenyl | —CH$_2$CH(OH)CH$_2$OC$_2$H$_5$ | H | —SO$_3$Na | H |
| 7 | 3-(COONH$_4$)phenyl | H | H | H | —SO$_3$NH$_4$ |
| 8 | 4-(HO)phenyl | H | —SO$_3$Na | —SO$_3$Na | H |
| 9 | 4-(COONH$_4$)phenyl | H | —SO$_3$NH$_4$ | —SO$_3$NH$_4$ | H |
| 10 | 2-NH$_2$-4-(NaO$_3$S)phenyl | —CH$_2$COONa | —SO$_3$Na | —SO$_3$Na | H |
| 11 | 3-OH-4-(COONH$_4$)phenyl | —CH$_2$CH$_2$COONH$_4$ | H | —SO$_3$NH$_4$ | H |

-continued

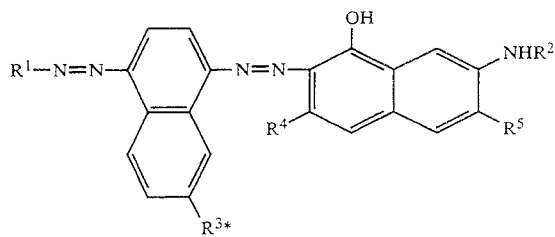

| Compound No. | R¹ | R² | R³* | R⁴ | R⁵ |
|---|---|---|---|---|---|
| 12 | (4-methylnaphthalene-2-sulfonate, $SO_3Li$) | H | $-SO_3Li$ | $-SO_3Li$ | H |
| 13 | (1-hydroxy-4-methyl-7-sulfonaphthalene, $NaO_3S$, HO) | H | $-SO_3Na$ | $-SO_3Na$ | $-SO_3Na$ |
| 14 | (4-methyl-6-amino-1-sulfonaphthalene, $NaO_3S$, $NH_2$) | (4-hydroxyphenyl, $-OH$) | H | $-SO_3Na$ | H |
| 15 | (1-hydroxy-4-methyl-7-carboxynaphthalene, HO, NaOOC) | $-CH_2COONa$ | H | $-SO_3Na$ | $-SO_3Na$ |
| 16 | (3,5-dicarboxyphenyl, COOLi, COOLi) | $-CH_2CH_2COOLi$ | $-SO_3Li$ | $-SO_3Li$ | H |
| 17 | (2-naphthyl) | H | $-SO_3Li$ | $-SO_3Li$ | H |

-continued

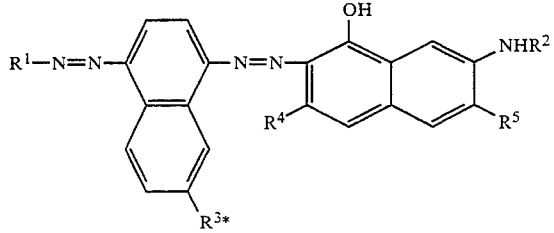

| Compound No. | $R^1$ | $R^2$ | $R^{3*}$ | $R^4$ | $R^5$ |
|---|---|---|---|---|---|
| 18 | OH / naphthyl-SO$_3$NH$_4$ | —COCH$_3$ | H | —SO$_3$NH$_4$ | —SO$_3$NH$_4$ |
| 19 | NH$_2$ / naphthyl | H | —SO$_3$Na | H | —SO$_3$Na |
| 20 | COONH$_4$ / naphthyl | H | —SO$_3$NH$_4$ | —SO$_3$NH$_4$ | H |
| 21 | COONa / phenyl-COONa | H | H | —SO$_3$Na | —SO$_3$Na |
| 22 | COONH$_4$ / phenyl-COONH$_4$ | H | —SO$_3$NH$_4$ | —SO$_3$NH$_4$ | H |
| 23 | COONH(C$_2$H$_5$OH)$_3$ / phenyl-COONH(C$_2$H$_5$OH)$_3$ | —COCH$_3$ | —SO$_3$NH(C$_2$H$_5$OH)$_3$ | —SO$_3$NH(C$_2$H$_5$OH) | H |

The dyes represented by the general formula (I) can be produced by known methods and methods similar thereto. For example, the dyes represented by the general formula (I) can be produced by a method described in Japanese Patent Laid-Open No. 140270/1990 and Colour Index, Third Edition, the Society of Dyers and Colourists.

Second Dye

The second dye used in the ink composition of the present invention is a dye selected from the group consisting of C.I. Direct Yellow 86, 132 and 144 and compounds represented by the following general formulae (II) and (III).

C.I. Direct Yellow 86, 132 and 144 are described in, for example, Color Index, Third Edition.

The compounds represented by the general formula (II) are those that, as such, may be used as a dye. In the general formula (II), the phenyl group or naphthyl group as the $R^6$ may be unsubstituted or substituted. When the $R^6$ represents a substituted phenyl group, preferred examples of the substituent include a hydroxyl group, —NH$_2$, a sulfonic group and a carboxy group. The sulfonic group and carboxy group may be in the form of a free acid or a salt. Preferred examples of the salt include salts of sulfonic acid and carboxylic acid with an alkali metal, ammonia or amine (preferably tri(hydroxy C$_{1-6}$ alkyl)amine). Although there is no particular limitation on the position of the substituent, the substituent is preferably located at the 3- or 4-position. The naphthyl group as the $R^6$ may be either 1-naphthyl or 2-naphthyl and unsubstituted or substituted. When the $R^1$ represents a substituted naphthyl group, preferred examples of the substituent include those described above in connection with the phenyl group.

Specific preferred examples of the compound represented by the general formula (II) are as follows.

$R^6-N=N-\text{(naphthyl)}-R^{7*}$

| Compound No. | $R^6$ | $R^{7*}$ |
|---|---|---|
| 1 | phenyl | $-SO_3Na$ |
| 2 | 3-COOLi-phenyl | H |
| 3 | 4-$NaO_3S$-phenyl | H |
| 4 | 3-$COONH_4$-phenyl | H |
| 5 | 4-NaOOC-phenyl | $-SO_3Na$ |
| 6 | 3-$COONH_4$-phenyl | $-SO_3NH_4$ |
| 7 | 4-HO-phenyl | $-SO_3Na$ |
| 8 | $H(C_2H_5OH)_3NO_3S$-(NH)-phenyl | $-SO_3N(C_2H_5OH)_3H$ |
| 9 | 1-naphthyl | $-SO_3Na$ |
| 10 | $SO_3Li$-naphthyl | $-SO_3Li$ |
| 11 | HO-, $SO_3Na$-naphthyl | $-SO_3Na$ |
| 12 | $NaO_3S$-naphthyl | H |
| 13 | HO-, $SO_3NH_4$-naphthyl | H |
| 14 | $NaO_3S$-, $NH_2$-naphthyl | H |
| 15 | 2-naphthyl | $-SO_3Li$ |
| 16 | $NH_2$-naphthyl | $-SO_3N(C_2H_5OH)_3H$ |
| 17 | $SO_3Na$-naphthyl | $-SO_3Na$ |
| 18 | $SO_3NH_4$-, $SO_3NH_4$-naphthyl | H |
| 19 | $NH_2$, OH, $SO_3Na$-naphthyl | H |
| 20 | $NH_2$, $SO_3Na$, $SO_3Na$-naphthyl | H |

The dyes represented by the general formula (II) can be produced by known methods and methods similar thereto. For example, the dyes represented by the general formula (II) are described as an intermediate of black dyes in Japanese Patent Laid-Open No. 140270/1990 and can be produced according to a method described therein.

As with the compounds represented by the general formula (II), the compounds represented by the general formula (III) are those that, as such, may be used as a dye. In the general formula (III), the alkyl group as the $R^8$ and $R^9$ is preferably a $C_{1-6}$ alkyl group, still preferably a $C_{1-4}$ alkyl group. The hydroxyalkyl group as the $R^8$ and $R^9$ is preferably a hydroxy $C_{1-6}$ alkyl group, still preferably a hydroxy $C_{1-4}$ alkyl group. Compounds represented by the general formula (III) wherein $R^8$ and $R^9$ simultaneously represent a hydrogen atom are excluded from the scope of the present invention. In the general formula (III), the alkyl group as the $R^{10}$ and $R^{11}$ is preferably a $C_{1-6}$ alkyl group, still preferably a $C_{1-4}$ alkyl group. The alkoxy group as the $R^{10}$ and $R^{11}$ is preferably a $C_{1-6}$ alkoxy group, still preferably a $C_{1-4}$ alkoxy group.

Specific preferred examples of the compound represented by the general formula (III) are as follows.

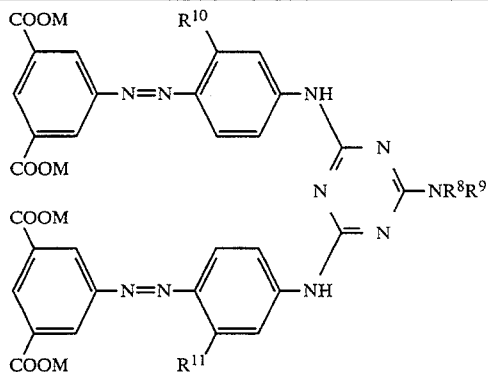

(III)

| Compound No. | M | $R^8$ | $R^9$ | $R^{10}$ | $R^{11}$ |
|---|---|---|---|---|---|
| 1 | Na | H | —C₂H₅OH | H | H |
| 2 | NH₄ | H | —C₂H₅OH | —CH₃ | —CH₃ |
| 3 | NH₄ | H | —C₂H₅OH | —O—CH₃ | —O—CH₃ |
| 4 | Li | —C₂H₅OH | —C₂H₅OH | —CH₃ | —CH₃ |
| 5 | NH₄ | —C₂H₅OH | —C₂H₅OH | —CH₃ | —CH₃ |
| 6 | Na | —CH₃ | —C₂H₅OH | —O—CH₃ | —O—CH₃ |
| 7 | Na | —CH₃ | —C₂H₅ | —O—CH₃ | —O—CH₃ |
| 8 | NH₄ | —C₂H₅ | —C₂H₅ | —CH₃ | —CH₃ |
| 9 | NH(C₂H₅OH)₃ | H | —C₂H₅OH | —O—CH₃ | —O—CH₃ |

The dyes represented by the general formula (III) can be produced by known methods and methods similar thereto. For example, the dyes represented by the general formula (III) can be produced by a method described in Japanese Patent Laid-Open No. 179100/1991 and Colour Index, Third Edition.

Ink Composition

In the ink composition according to the present invention, the content of the dye represented by the general formula (I) is preferably 0.1 to 10% by weight, still preferably 1 to 5% by weight. When the content of the dye represented by the general formula (I) is less than the above range, no satisfactory print density is often provided. On the other hand, when it exceeds the above range, since the dissolution stability of the dye is deteriorated, clogging of nozzles often occurs. The dyes represented by the general formula (I) may be added alone or in the form of a mixture of two or more of them.

According to the present invention, an ink composition excellent in blackness can be provided by incorporating the first dye in combination with the second dye.

In the ink composition according to the present invention, the content of C.I. Direct Yellow 86, 132 or 144 as the second dye is preferably in the range of from 0.001 to 0.5% by weight, still preferably in the range of from 0.005 to 0.4% by weight.

When the second dye is a dye represented by the general formula (II), the content of the dye represented by the general formula (II) is preferably in the range of from 0.001 to 0.5% by weight, still preferably in the range of from 0.05 to 0.4% by weight.

When the second dye is a dye represented by the general formula (III), the content of the dye represented by the general formula (III) in the ink composition according to the present invention is preferably in the range of from 0.005 to 0.5% by weight, still preferably in the range of from 0.01 to 0.04% by weight.

These second dyes may be added alone or in the form of a mixture of two or more of them.

The solvent for the ink composition of the present invention may be water or a mixed solvent comprising water and a water-soluble organic solvent, and the mixed solvent comprising water and a water-soluble organic solvent is preferred. Examples of the water-soluble organic solvent used in the form of a mixture with water include lower alcohols, such as ethanol, 1-propanol and 2-propanol; polyhydric alcohols, such as ethylene glycol, diethylene glycol, triethylene glycol, propylene glycol and glycerin; ethers of polyhydric alcohols, such as ethylene glycol monomethyl ether, diethylene glycol monobutyl ether and propylene glycol monoethyl ether; nitrogen-containing compounds, such as formamide, dimethylformamide, diethanolamine, triethanolamine, 1,3-dimethyl-2-imidazolidinone, 2-pyrrolidone and N-methyl-2pyrrolidone; and sulfur-containing compounds, such as thiodiglycol and dimethylsulfoxide.

In particular, the addition of nitrogen-containing compounds, such as 1,3-dimethyl-2-imidazolidinone, 2-pyrrolidone and N-methyl-2-pyrrolidone, is preferred from the viewpoint of quick resumption of normal printing after clogging, and the amount of addition thereof is preferably in the range of from about 1 to 10% by weight.

The addition of triethanolamine is preferably in the range of from about 0.5 to 2% by weight from the viewpoint of color development of the dye and printing density.

Further dyes may be added to the ink composition of the present invention so far as the addition thereof is not detrimental to blackness of the ink and other effects. According to a preferred embodiment of the present invention, the addition of dyes having a surface activity is advantageous. The addition of such dyes having a surface activity can contribute to an improvement in the wettability of the recording head and ink path by the ink composition. As a result, bubbles, which have intruded into the recording head and ink path, can be easily discharged. Specific examples of the dyes of this type include C.I. Direct Black 154 and 168.

Furthermore, if necessary, various additives may be added to the ink composition of the present invention for the purpose of improving various properties of the ink composition. For example, resins, polymers, surfactants, pH adjustors, fungicides and ultraviolet absorbers may be added.

EXAMPLES

The present invention will now be described in more detail with reference to the following Examples, though it is not limited to these Examples only.

Production of Ink Composition

Ink compositions comprising components specified in the following Tables 1 to 5, that is, ink compositions of Examples A1 to A10, B1 to B10, C1 to C12, D1 to D10 and E1 to E11 and Comparative Examples A1 to A3, B1 to B3, C1 to C3, D1 to D3 and E1 to E3 were produced as follows. Specifically, individual components were mixed with each other, and the mixtures were filtered under pressure through a membrane filter having a pore diameter of 0.8 μm. Thereafter, the filtrates were deaerated with a vacuum pump to provide ink compositions.

In the tables, the balance of the components consists of water.

Evaluation Test

Various properties of the ink compositions of Examples and Comparative Examples were evaluated by the following methods. The results were as given in the tables.

In the evaluation test, print samples and 100% duty print samples were provided by printing with an ink jet printer HG-5130 (manufactured by Seiko Epson Corporation) using the ink compositions of Examples and Comparative Examples. In the tables, the results of evaluation given in parentheses were obtained by an evaluation test effected in the same manner as that described just above, except that use was made of an ink jet printer BJ-330 (manufactured by Canon Inc.). Further, in the evaluation tests (2) to (6), recording paper (a) is an ink jet coat paper NM available from Mitsubishi Paper Mills, Ltd., recording paper (b) Cannon Dry available from Canon Sales Co., Inc., recording paper (c) Xerox 4024 available from Xerox Co., (d) Xerox P available from Fuji Xerox Co., Ltd. and recording paper (e) Recopy 6200 available from Ricoh Co., Ltd.

Evaluation test 1: Water resistance (1) Water droplets were dropped onto a printed portion of the print sample which was then spontaneously dried and observed to evaluate the water resistance under the following criteria.

⊚: No change from the initial state observed.
○: Slight dissolution of dye observed with letters being still legible.
Δ: Blurring observed with letters being still legible.
×: Blurring of letters observed with letters being illegible.

(2) The 100% duty print sample was immersed in water for 24 hr. Then, a OD retention was determined by the following equation:

$$OD \text{ Retention } (\%) = \frac{OD \text{ value after immersion}}{OD \text{ value before immersion}} \times 100$$

Evaluation test 2: Blackness

Tone of the 100% duty print samples on recording paper (a) to (e) was observed with the naked eye. The criteria of the evaluation were as follows.

⊚: Substantially pure black with good vividness
○: Pure black with slight lack of vividness
Δ: Pure black with poor vividness
×: Color close to black but different from black in hue Evaluation test 3: Resumption of normal printing after clogging An ink jet printer HG-5130 was filled with the ink composition and allowed to stand at 40° C. for one month without capping the recording head. Thereafter, the number of times of cleaning operation necessary for resuming normal printing was determined. The criteria of the evaluation were as follows.

⊚: 0 to twice
○: 3 to 5 times
Δ: 5 times or more
×: Not resumable

Evaluation test 4: Jetting stability (1) Printing was continuously effected on 1000 sheets of recording paper using a piezo drive on-demand ink jet recording head (48 nozzles, diameter 40 μm) at a driving frequency of 7.2 kHz and 10 kHz. The results were evaluated as follows.

○: Successful printing without abnormal phenomenon
×: Failure of jetting and turbulence of print (2) Bubbles were intentionally introduced into the head of the ink jet printer, and the number of times of cleaning operation necessary for resuming normal printing was determined. The criteria of the evaluation were as follows.

⊚: once
○: 2 to 3 times
Δ: 4 to 5 times
×: 5 times or more or not resumable

Evaluation test 5: Storage stability

The ink composition was hermetically sealed in a glass vessel and allowed to stand at −30° C. and 70° C. for one month, and observation was effected on a change in the properties of the ink, a change in the tone and precipitation of insolubles after standing. The results were evaluated as follows.

○: Neither a change in the properties and tone nor occurrence of a precipitate observed.
Δ: A change in the properties or tone observed.
×: A change in the properties or tone or occurrence of a precipitate observed.

Evaluation test 6: Quality of image

The print was observed with the naked eye to evaluate the sharpness of the image in terms of blurring and density according to the following criteria.

⊚: No blurring and a high density
○: Slight blurring without detriment to image and a high density
×: Severe blurring and a low density Evaluation test 7: Light fastness The 100% duty print samples were irradiated with light for 50 hr using a xenon fadeometer, and the change in the OD value between before irradiation and after irradiation was determined. The results were evaluated as follows.

○: 0 to less than 5%
Δ: 5 to less than 10%
×: 10% or more

TABLE 1

| | | A1 | A2 | A3 | A4 | A5 | A6 | A7 | A8 | A9 | A10 | A1 | A2 | A3 |
|---|---|---|---|---|---|---|---|---|---|---|---|---|---|---|
| | | Examples | | | | | | | | | | Comparative Examples | | |
| First dye General formula (I) Compd. No. (wt. %) | | 4 (2) | 7 (2.5) | 8 (4) | 12 (3) | 13 (2) | 14 (2.5) | 17 (5) | 2 (3) | 7 (9) | 10(0.5) 15(0.5) | 4 (2) | 12 (3) | 7 (10) |
| Second dye General formula (II) Compd. No. (wt. %) | | 6 (0.4) | 4 (0.3) | 7 (1) | 10 (0.4) | 7 (0.1) | 14 (0.5) | 15 (0.5) | 2 (1) | 4(1) 6(1) | (0.1) | | | |
| Ratio of dyes added (first):(second) | | 1:0.2 | 1:0.12 | 1:0.25 | 1:0.13 | 1:0.05 | 1:0.2 | 1:0.1 | 1:0.33 | 1:0.22 | 1:0.10 | | | |
| Glycerin | | 8 | | 6 | 5 | 3 | | | | 15 | 5 | 8 | 5 | 15 |
| Diethylene glycol | | | 15 | | | | 10 | 10 | | | | | | |
| Polyethylene glycol #200 | | | | | | | | 10 | | | | | | |
| 1,3-Propanediol | | | | | | | | | | | 10 | | | |
| Thiodiglycol | | | 10 | | | | | | | | | | | |
| 1,3-Dimethyl-2-imidazolidinone | | | | | 2 | | | | | | | | | 2 |
| 2-Pyrrolidone | | | | | | 3 | | | | | 10 | | | 10 |
| N-Methyl-2-pyrrolidone | | | | | | | | | 1 | | | | | |
| Triethanolamine | | | | | | | 1 | | | | | | | |
| Ethanol | | 6 | | | | 5 | | | 2 | | | 6 | | |
| 1-Propanol | | | | 4 | 3 | | | | | | 7 | | 3 | |
| 2-Propanol | | | 3.5 | | | | 2 | | | | | | | |
| Leafinol 465 | | | | | | | | 1 | | 1 | | | | 1 |
| α-Cyclodextrin | | | | | | | | | | | 3 | | | |
| Test 1 Water resistance | (1) (2) | ⊚ 95 | ⊚ 90 | ○ 87 | ⊚ 92 | ○ 90 | ⊚ 90 | ○ 85 | ○ 88 | ○ 90 | ○ 82 | ⊚ 95 | ○ 90 | ⊚ 90 |
| Test 2 Blackness | (a) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ⊚(⊚) |
| | (b) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ×(×) | Δ(Δ) | Δ(Δ) |
| | (c) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | Δ(Δ) | ×(×) | Δ(Δ) |
| | (d) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | Δ(Δ) | ×(×) | Δ(Δ) |
| | (e) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | Δ(Δ) | ×(×) | Δ(Δ) |
| Test 3 Resumption after clogging | | ⊚(⊚) | ○(○) | ⊚(⊚) | ⊚(⊚) | ⊚(⊚) | ⊚(⊚) | ○(○) | ○(○) | ○(Δ) | ⊚(⊚) | ○(○) | Δ(Δ) | |
| Test 4 Jetting stability | (1) (2) | ○(○) ○ | ○(○) ○ | ○(○) ⊚ | ○(○) ⊚ | ○(○) ⊚ | ○(○) ○ | ○(○) ⊚ | ○(○) ⊚ | ○(○) ○ | ○(○) ○ | ○(○) ○ | ○(○) ⊚ | ○(○) ○ |
| Test 5 Storage stability | | ○ | ○ | ○ | ○ | ○ | ○ | ○ | ○ | ○ | ○ | ○ | ○ | ○ |
| Test 6 Quality of image | (a) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ⊚(⊚) |
| | (b) | ⊚(⊚) | ⊚(⊚) | ⊚(⊚) | ⊚(⊚) | ⊚(⊚) | ⊚(⊚) | ○(○) | ⊚(⊚) | ○(○) | ○(○) | ×(×) | ×(×) | ○(○) |
| | (c) | ⊚(⊚) | ⊚(⊚) | ⊚(⊚) | ⊚(⊚) | ⊚(⊚) | ⊚(⊚) | ⊚(⊚) | ○(○) | ○(○) | ○(○) | ×(×) | ×(×) | ○(○) |
| | (d) | ⊚(⊚) | ⊚(⊚) | ⊚(⊚) | ⊚(⊚) | ⊚(⊚) | ⊚(⊚) | ⊚(⊚) | ○(○) | ○(○) | ○(○) | ×(×) | ×(×) | ○(○) |
| | (e) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ×(×) | ×(×) | ○(○) |
| Test 7 Light fastness | | ○ | ○ | ○ | ○ | ○ | ○ | ○ | ○ | ○ | ○ | Δ | ○ | ○ |

TABLE 2

| | B1 | B2 | B3 | B4 | B5 | B6 | B7 | B8 | B9 | B10 | B1 | B2 | B3 |
|---|---|---|---|---|---|---|---|---|---|---|---|---|---|
| | Examples | | | | | | | | | | Comparative Examples | | |
| First dye General formula (I) Compd. No. (wt. %) | 1 (2) | 8 (3) | 10 (5) | 13 (3) | 22 (2) | 16 (2.5) | 15 (5) | 3 (3) | 1(9) 21(1) | 11(0.5) 20(0.5) | 1 (2) | 13 (3) | 22 (10) |
| Second dye C.I. Direct Yellow 86 (wt. %) | 0.5 | 1 | 2 | 0.4 | 0.3 | 0.1 | 0.02 | 0.015 | 4 | 0.05 | | | |
| Ratio of dyes added (first):(second) | 1:0.25 | 1:0.33 | 1:0.40 | 1:0.13 | 1:0.15 | 1:0.04 | 1:0.004 | 1:0.005 | 1:0.40 | 1:0.10 | | | |
| Glycerin | 8 | | 6 | 5 | 3 | | | | 15 | 5 | 8 | 5 | 15 |
| Diethylene glycol | | 15 | | | | 10 | 10 | | | | | | |
| Polyethylene glycol #200 | | | | | | | 10 | | | | | | |
| 1,3-Propanediol | | | | | | | | | | 10 | | | |
| Thiodiglycol | | | 6 | | | | | | | | | | |
| 1,3-Dimethyl-2-imidazolidinone | | | | 2 | | | | | | | | | 2 |
| 2-Pyrrolidone | | | | | 3 | | | | | 10 | | | 10 |
| N-Methyl-2-pyrrolidone | | | | | | | | 1 | | | | | |
| Triethanolamine | | | | | | 1 | 1 | | | | | | |
| Ethanol | 6 | | | | 5 | | | 2 | | | 6 | | |

TABLE 2-continued

|  |  | Examples |  |  |  |  |  |  |  |  |  | Comparative Examples |  |  |
|---|---|---|---|---|---|---|---|---|---|---|---|---|---|---|
|  |  | B1 | B2 | B3 | B4 | B5 | B6 | B7 | B8 | B9 | B10 | B1 | B2 | B3 |
| 1-Propanol |  |  |  | 4 | 3 |  |  |  |  |  | 7 |  | 3 |  |
| 2-Propanol |  |  | 3.5 |  |  |  | 2 |  |  |  |  |  |  |  |
| Leafinol 465 |  |  |  |  |  |  |  | 1 |  | 1 |  |  |  | 1 |
| α-Cyclodextrin |  |  |  |  |  |  |  |  |  |  | 3 |  |  |  |
| Test 1 | (1) | ⊚ | ⊚ | ○ | ⊚ | ○ | ⊚ | ⊚ | ○ | ○ | ○ | ⊚ | ⊚ | ○ |
| Water resistance | (2) | 90 | 95 | 85 | 87 | 85 | 90 | 87 | 90 | 90 | 92 | 90 | 87 | 85 |
| Test 2 | (a) | ⊚(⊚) | ⊚(⊚) | ⊚(⊚) | ⊚(⊚) | ⊚(⊚) | ⊚(⊚) | ⊚(⊚) | ⊚(○) | ⊚(⊚) | ⊚(○) | ○(○) | ○(○) | ⊚(⊚) |
| Blackness | (b) | ⊚(⊚) | ⊚(⊚) | ⊚(⊚) | ⊚(⊚) | ⊚(⊚) | ⊚(⊚) | ○(○) | ○(○) | ⊚(⊚) | ○(○) | ×(×) | △(△) | △(△) |
|  | (c) | ⊚(⊚) | ⊚(⊚) | ⊚(⊚) | ⊚(⊚) | ⊚(⊚) | ⊚(⊚) | ○(○) | ○(○) | ⊚(⊚) | ○(○) | △(△) | ×(×) | △(△) |
|  | (d) | ⊚(⊚) | ⊚(⊚) | ⊚(⊚) | ⊚(⊚) | ⊚(⊚) | ⊚(⊚) | ○(○) | ○(○) | ⊚(⊚) | ○(○) | △(△) | ×(×) | △(△) |
|  | (e) | ⊚(⊚) | ⊚(⊚) | ⊚(⊚) | ⊚(⊚) | ⊚(⊚) | ⊚(⊚) | ○(○) | ○(○) | ⊚(⊚) | ○(○) | △(△) | ×(×) | △(△) |
| Test 3 |  | ⊚(⊚) | ⊚(⊚) | ⊚(⊚) | ⊚(○) | ⊚(○) | ⊚(⊚) | ○(△) | ○(○) | ○(△) | ○(○) | ⊚(⊚) | ⊚(○) | △(△) |
| Resumption after clogging |  |  |  |  |  |  |  |  |  |  |  |  |  |  |
| Test 4 | (1) | ○(○) | ○(○) | ○(○) | ○(○) | ○(○) | ○(○) | ○(○) | ○(○) | ○(○) | ○(○) | ○(○) | ○(○) | ○(○) |
| Jetting stability | (2) | ○ | ○ | ⊚ | ⊚ | ○ | ○ | ⊚ | ⊚ | ○ | ○ | ○ | ⊚ | ○ |
| Test 5 |  | ○ | ○ | ○ | ○ | ○ | ○ | ○ | ○ | ○ | ○ | ○ | ○ | ○ |
| Storage stability |  |  |  |  |  |  |  |  |  |  |  |  |  |  |
| Test 6 | (a) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ⊚(⊚) |
| Quality of image | (b) | ⊚(⊚) | ⊚(⊚) | ⊚(⊚) | ⊚(⊚) | ⊚(⊚) | ⊚(⊚) | ○(△) | ⊚(○) | ⊚(○) | ○(○) | ×(×) | ×(×) | ○(○) |
|  | (c) | ⊚(⊚) | ⊚(⊚) | ⊚(⊚) | ⊚(⊚) | ⊚(⊚) | ⊚(⊚) | ○(○) | ⊚(⊚) | ⊚(⊚) | ○(○) | ×(×) | ×(×) | ○(○) |
|  | (d) | ⊚(⊚) | ⊚(⊚) | ⊚(⊚) | ⊚(⊚) | ⊚(⊚) | ⊚(⊚) | ⊚(○) | ⊚(⊚) | ⊚(⊚) | ○(○) | ×(×) | ×(×) | ○(○) |
|  | (e) | ⊚(⊚) | ⊚(⊚) | ⊚(⊚) | ⊚(⊚) | ⊚(⊚) | ⊚(⊚) | ○(○) | ⊚(⊚) | ⊚(⊚) | ○(○) | ×(×) | ×(×) | ○(○) |
| Test 7 |  | ○ | ○ | ○ | ○ | ○ | ○ | ○ | ○ | ○ | ○ | △ | ○ | ○ |
| Light fastness |  |  |  |  |  |  |  |  |  |  |  |  |  |  |

TABLE 3

| | Examples | | | | | | | | | | | | | Comparative Examples | | |
|---|---|---|---|---|---|---|---|---|---|---|---|---|---|---|---|---|
| | C1 | C2 | C3 | C4 | C5 | C6 | C7 | C8 | C9 | C10 | C11 | C12 | C13 | C1 | C2 | C3 |
| First dye | | | | | | | | | | | | | | | | |
| General formula (I) | 1 | 8 | 10 | 13 | 22 | 16 | 15 | 3 | 1(9) | 11(0.5) | 5(3) | 5(3) | 22(2.5) | 1 | 13 | 22 |
| Compd. No. (wt. %) | (2) | (3) | (5) | (3) | (2) | (2.5) | (5) | (3) | 21(1) | 20(0.5) | | | | (2) | (3) | (10) |
| Second dye | | | | | | | | | | | | | | | | |
| C.I. Direct Yellow 132 (wt. %) | 0.5 | 1 | 2 | 0.4 | 0.3 | 0.1 | 0.02 | 0.015 | 4 | 0.05 | 0.3 DB168*1 (0.2) | 0.3 DB168 (0.2) | 0.3 DB154*2 (0.3) | | | |
| Ratio of dyes added (first):(second) | 1:0.25 | 1:0.33 | 1:0.40 | 1:0.13 | 1:0.15 | 1:0.04 | 1:0.004 | 1:0.005 | 1:0.40 | 1:0.10 | 1:0.1 | 1:0.1 | 1:0.28 | | | |
| Glycerin | 8 | | 6 | 5 | 3 | | | | 15 | 5 | 4 | 3 | 3 | 8 | 5 | 15 |
| Diethylene glycol | | 15 | | | | 10 | 10 | | | | | | | | | |
| Polyethylene glycol #200 | | | | | | | 10 | | | | | | | | | |
| 1,3-Propanediol | | | | | | | | 10 | | | | | | | | |
| Thiodiglycol | | | 6 | | | | | | | | | | | | | |
| 1,3-Dimethyl-2-imidazolidinone | | | | 2 | | | | | | | | | | | | |
| 2-Pyrrolidone | | | | | 3 | | | | 10 | | 3 | 2 | 4 | | 2 | 10 |
| N-Methyl-2-pyrrolidone | | | | | 1 | 1 | | 1 | | | | 1 | 1 | | | |
| Triethanolamine | | | | 3 | 5 | | | 2 | | | 5 | 4 | 4 | | | |
| Ethanol | 6 | | | | | 2 | | | | 7 | | | | 6 | | |
| 1-Propanol | | | 4 | | | | | | | | | | | | 3 | |
| 2-Propanol | | 3.5 | | | | | | | | | | | | | | |
| Leafinol 465 | | | | | | | 1 | | 1 | 3 | | | | | | 1 |
| α-Cyclodextrin | | | | | | | | | | | | | | | | |
| Test 1 Water resistance | ⊚ | ⊚ | ○ | ○ | ○ | ⊚ | ⊚ | ⊚ | ⊚ | ○ | ⊚ | ⊚ | ○ | ⊚ | ⊚ | ○ |
| | 90 | 95 | 86 | 88 | 85 | 90 | 90 | 90 | 90 | 92 | 95 | 95 | 88 | 90 | 88 | 83 |
| Test 2 Blackness | ⊚○○○○ | ⊚○○○○ | ⊚○○○○ | ⊚○○○○ | ⊚○○○○ | ⊚○○○○ | ⊚○○○○ | ⊚○○○○ | ⊚○○○○ | ⊚○○○○ | ⊚○○○○ | ⊚○○○○ | ⊚○○○○ | ○×○△△ | ○○△×× | ⊚△△△△ |
| Test 3 Resumption after clogging | ○○○○ | ○○○○ | ○○○○ | ○○○○ | ○○○○ | ○○○○ | ○○○△ | ○○○○ | ○○○△ | ○○○○ | ○○○○ | ○○○○ | ○○○○ | ⊚○○○ | ⊚○○○ | ⊚○○△ |
| Test 4 Jetting stability | ⊚○○○ | ⊚○○○ | ⊚○○○ | ⊚○○○ | ⊚○○○ | ⊚○○○ | ⊚○○○ | ⊚○○○ | ⊚○○○ | ⊚○○○ | ⊚○○○ | ⊚○○○ | ⊚○○○ | ⊚×○× | ⊚×○× | △△△△ |
| Test 5 Quality of image | ○○○○○ | ○○○○○ | ○○○○○ | ○○○○○ | ○○○○○ | ○○○○○ | ○○○○○ | ○○○○○ | ○○○○○ | ○○○○○ | ○○○○○ | ○○○○○ | ○○○○○ | ○○○×× | ○○○×× | ○○○○○ |
| Test 6 | ○ | ○ | ○ | ○ | ○ | ○ | ○ | ○ | ○ | ○ | ○ | ○ | ○ | △ | ○ | ○ |
| Test 7 Light fastness | | | | | | | | | | | | | | | | |

TABLE 4

|  |  | Examples |  |  |  |  |  |  |  |  |  | Comparative Examples |  |  |
|---|---|---|---|---|---|---|---|---|---|---|---|---|---|---|
|  |  | D1 | D2 | D3 | D4 | D5 | D6 | D7 | D8 | D9 | D10 | D1 | D2 | D3 |
| First dye General formula (I) Compd. No. (wt. %) |  | 1 (2) | 8 (3) | 10 (5) | 13 (3) | 22 (2) | 16 (2.5) | 15 (5) | 3 (3) | 1(9) 21(1) | 11(0.5) 20(0.5) | 1 (2) | 13 (3) | 22 (10) |
| Second dye C.I. Direct Yellow 144 (wt. %) |  | 0.5 | 1 | 2 | 0.4 | 0.3 | 0.1 | 0.02 | 0.015 | 4 | 0.05 |  |  |  |
| Ratio of dyes added (first):(second) |  | 1:0.25 | 1:0.33 | 1:0.40 | 1:0.13 | 1:0.15 | 1:0.04 | 1:0.004 | 1:0.005 | 1:0.40 | 1:0.10 |  |  |  |
| Glycerin |  | 8 |  | 6 | 5 | 3 |  |  |  | 15 | 5 | 8 | 5 | 15 |
| Diethylene glycol |  |  | 15 |  |  |  | 10 | 10 |  |  |  |  |  |  |
| Polyethylene glycol #200 |  |  |  |  |  |  |  | 10 |  |  |  |  |  |  |
| 1,3-Propanediol |  |  |  |  |  |  |  |  |  | 10 |  |  |  |  |
| Thiodiglycol |  |  |  | 6 |  |  |  |  |  |  |  |  |  |  |
| 1,3-Dimethyl-2-imidazolidinone |  |  |  |  | 2 |  |  |  |  |  |  |  | 2 |  |
| 2-Pyrrolidone |  |  |  |  |  | 3 |  |  |  | 10 |  |  |  | 10 |
| N-Methyl-2-pyrrolidone |  |  |  |  |  |  |  |  | 1 |  |  |  |  |  |
| Triethanolamine |  |  |  |  |  | 1 | 1 |  |  |  |  |  |  |  |
| Ethanol |  | 6 |  |  |  | 5 |  |  | 2 |  |  | 6 |  |  |
| 1-Propanol |  |  |  | 4 | 3 |  |  |  |  |  | 7 |  | 3 |  |
| 2-Propanol |  |  | 3.5 |  |  |  | 2 |  |  |  |  |  |  |  |
| Leafinol 465 |  |  |  |  |  |  |  | 1 |  | 1 |  |  |  | 1 |
| α-Cyclodextrin |  |  |  |  |  |  |  |  |  |  | 3 |  |  |  |
| Test 1 Water resistance | (1) (2) | ⊚ 90 | ⊚ 94 | ○ 85 | ⊚ 88 | ○ 85 | ⊚ 90 | ⊚ 88 | ○ 88 | ○ 90 | ○ 90 | ⊚ 90 | ⊚ 87 | ○ 85 |
| Test 2 Blackness | (a) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ⊚(⊚) |
|  | (b) | ⊚(⊚) | ⊚(⊚) | ⊚(⊚) | ⊚(⊚) | ⊚(⊚) | ⊚(⊚) | ○(○) | ⊚(⊚) | ○(○) | ○(○) | ×(×) | △(△) | △(△) |
|  | (c) | ⊚(⊚) | ⊚(⊚) | ⊚(⊚) | ⊚(⊚) | ⊚(⊚) | ⊚(⊚) | ○(○) | ○(○) | ○(○) | ○(○) | △(△) | ×(×) | △(△) |
|  | (d) | ⊚(⊚) | ⊚(⊚) | ⊚(⊚) | ⊚(⊚) | ⊚(⊚) | ⊚(⊚) | ⊚(⊚) | ○(○) | ⊚(⊚) | ○(○) | △(△) | ×(×) | △(△) |
|  | (e) | ⊚(⊚) | ⊚(⊚) | ⊚(⊚) | ⊚(⊚) | ⊚(⊚) | ⊚(⊚) | ⊚(⊚) | ○(○) | ⊚(⊚) | ○(○) | △(△) | ×(×) | △(△) |
| Test 3 Resumption after clogging |  | ⊚(⊚) | ⊚(⊚) | ⊚(⊚) | ⊚(○) | ⊚(○) | ⊚(⊚) | ○(△) | ○(○) | ○(△) | ○(○) | ⊚(⊚) | ⊚(○) | △(△) |
| Test 4 Jetting stability | (1) (2) | ○(○) ○ | ○(○) ⊚ | ○(○) ⊚ | ○(○) ⊚ | ○(○) ○ | ○(○) ○ | ○(○) ⊚ | ○(○) ⊚ | ○(○) ○ | ○(○) ○ | ○(○) ○ | ○(○) ⊚ | ○(○) ○ |
| Test 5 Storage stability |  | ○ | ○ | ○ | ○ | ○ | ○ | ○ | ○ | ○ | ○ | ○ | ○ | ○ |
| Test 6 Quality of image | (a) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ⊚(⊚) |
|  | (b) | ⊚(⊚) | ⊚(⊚) | ⊚(⊚) | ⊚(⊚) | ⊚(⊚) | ⊚(⊚) | ○(△) | ⊚(⊚) | ○(○) | ○(○) | ×(×) | ×(×) | ○(○) |
|  | (c) | ⊚(⊚) | ⊚(⊚) | ⊚(⊚) | ⊚(⊚) | ⊚(⊚) | ⊚(⊚) | ⊚(⊚) | ⊚(⊚) | ○(○) | ○(○) | ×(×) | ×(×) | ○(○) |
|  | (d) | ⊚(⊚) | ⊚(⊚) | ⊚(⊚) | ⊚(⊚) | ⊚(⊚) | ⊚(⊚) | ⊚(⊚) | ⊚(⊚) | ⊚(⊚) | ○(○) | ×(×) | ×(×) | ○(○) |
|  | (e) | ⊚(⊚) | ⊚(⊚) | ⊚(⊚) | ⊚(⊚) | ⊚(⊚) | ⊚(⊚) | ○(○) | ⊚(⊚) | ⊚(⊚) | ○(○) | ×(×) | ×(×) | ○(○) |
| Test 7 Light fastness |  | ○ | ○ | ○ | ○ | ○ | ○ | ○ | ○ | ○ | ○ | △ | ○ | ○ |

TABLE 5

| | Examples | | | | | | | | | | | Comparative Examples | | |
|---|---|---|---|---|---|---|---|---|---|---|---|---|---|---|
| | E1 | E2 | E3 | E4 | E5 | E6 | E7 | E8 | E9 | E10 | E11 | E1 | E2 | E3 |
| First dye General formula (I) Compd. No. (wt. %) | 1 (3) | 2 (3) | 5 (2) | 7 (2.5) | 13 (2) | 18 (3) | 23 (3) | 5(4) 7(4) | 22(10) | 5(0.5) 22(0.5) | 5(2) | 1 (3) | 5(4) 7(4) | 1 (3) |
| Second dye General formula (III) Compd. No. (wt. %) | 1(1) | 4(1.5) | 2(0.3) | 3(0.1) | 6(0.1) | 5(0.03) | 9(0.3) | 3(2) | 2(0.09) | 8(0.05) | 3(0.4) DB168*1 (0.2) | | | DB154*2 (1) |
| Ratio of dyes added | 1:0.33 | 1:0.50 | 1:0.15 | 1:0.04 | 1:0.05 | 1:0.01 | 1:0.1 | 1:0.25 | 1:0.009 | 1:0.05 | 1:0.3 | | | |
| Glycerin | 6 | 15 | 3 | 4 | 10 | 15 | | 15 | | 5 | 3 | 6 | 15 | 4 |
| Diethylene glycol | | | | | | | | | 10 | | | | | |
| Polyethylene glycol #200 | | | | | | | | | 10 | | | | | |
| 1,3-Propanediol | | | | | | | 10 | | | | | | | |
| Thiodiglycol | | | | | | | | | | | | | | |
| 1,3-Dimethyl-2-imidazolidinone | | | | | | | | | | | | | | |
| 2-Pyrrolidone | | | 3 | 2 | | | | | | | 3 | | | |
| N-Methyl-2-pyrrolidone | | | | | | | 1 | 10 | | | | | 10 | |
| Triethanolamine | | | | | | 1 | | | | | | | | |
| Ethanol | 0.5 | | 1 | 1.4 | 2 | | 2 | | | | 1 | 0.5 | | 1.4 |
| 1-Propanol | 4 | | 4 | 3 | 5 | | | | | | 4 | 4 | | 3 |
| 2-Propanol | | | | | | 3 | | | | | | | | |
| Leafinol 465 | | 3.5 | | | | | | | | | | | | |
| α-Cyclodextrin | | | | | | | | | 1 | 3 | | 1 | | |
| Test 1 | ⊙ | ⊙ | ⊙ | ⊙ | ⊙ | ⊙ | ⊙ | ⊙ | ⊙ | ⊙ | ⊙ | ⊙ | ⊙ | △ |
| Water resistance Test 2 | 92 | 90 | 95 | 90 | 88 | 88 | 92 | 87 | 90 | 94 | 90 | 90 | 90 | |
| Blackness | ⊙○○○○ | ⊙○○○○ | ⊙○○○○ | ⊙○○○○ | ○○○○○ | ⊙○○○○ | ⊙○○○○ | ⊙○○○○ | ○○○○○ | ⊙○○○○ | ⊙○○○○ | ○×△△○ | ○×△△○ | ○○○○○ |
| Test 3 Resumption after clogging | ⊙(⊙) | ⊙(○) | ⊙(⊙) | ⊙(⊙) | ⊙(⊙) | ○(○) | ⊙(⊙) | ⊙(⊙) | ○(△) | ⊙(⊙) | ⊙(○) | ×(×) | ×(×) | ×(×) |
| Test 4 Jetting stability | ○○○ | ○○○ | ○○○ | ○○○ | ○○○ | ○○○ | ○○○ | ○○○ | ○○○ | ○○○ | ○○○ | ○○○ | ○○○ | ⊙○× |
| Test 5 | | | | | | | | | | | | | | |
| Test 6 Quality of image | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ⊙○○○○ ⊙○○○○ | ×(×) ×(×) ×(×) ×(×) ×(×) | ×(×) ○○○○○ | ⊙○○○ ×(×) ×(×) ×(×) ×(×) |
| Test 7 Light fastness | ○ | △ | ○ | ○ | ○ | ○ | ○ | ○ | ○ | ○ | ○ | △ | ○ | △ |

We claim:

1. An ink composition comprising a first dye represented by formula (I):

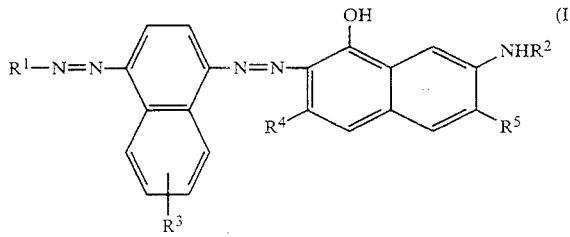

wherein $R^1$ represents a phenyl or naphthyl group which may be substituted by a hydroxyl group, —$NH_2$, —$SO_3M$ or —COOM wherein M represents a hydrogen atom or a cation species derived from an alkali metal, ammonia or an amine, $R^2$ represents a hydrogen, a carboxyalkyl group wherein the carboxy group may form a salt with an alkali metal or ammonia, a substituted or unsubstituted alkoxyalkyl group or a substituted or unsubstituted phenyl or alkanoyl group, and $R^3$, $R^4$ and $R^5$, which may be the same or different, each independently represent a hydrogen atom or —$SO_3M$ wherein M is as defined above, provided that $R^1$ does not represent a phenyl group substituted with —$SO_3M$ when $R^3$, $R^4$ and $R^5$ all represent —$SO_3M$;

and a second dye selected from the group consisting of C.I. Direct Yellow 86, 132 and 144 and compounds represented by formula (II):

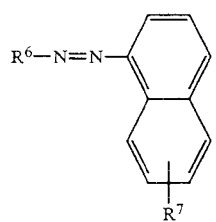

wherein $R^6$ represents a phenyl or naphthyl group which may be substituted by a hydroxyl group, —$NH_2$, —$SO_3M$ or —COOM wherein M represents a hydrogen atom or a cation species derived from an alkali metal, ammonia or an amine, and $R^7$ represents a hydrogen atom or —$SO_3M$ wherein M is as defined above; or formula III:

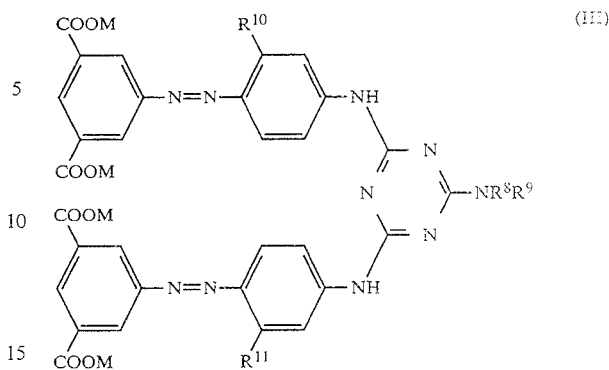

wherein $R^8$ and $R^9$, which may be the same or different, each independently represent a hydrogen atom, an alkyl group or a hydroxyalkyl group, provided that $R^8$ and $R^9$ do not simultaneously represent a hydrogen atom, and $R^{10}$ and $R^{11}$, which may be the same or different, each independently represent a hydrogen atom, an alkyl group, a hydroxyalkyl group or an alkoxy group;

said first dye being present in the composition in an amount sufficient to enable the composition to form a print image having a black hue on a recording medium, said second dye being present in the composition in an amount sufficient to improve vividness of the black hue or sharpness of the image or both.

2. An ink composition according to claim 1, wherein in the dye represented by formula (I), $R^1$ represents a phenyl or naphthyl group which may be substituted by a hydroxyl group, —$NH_2$, —$SO_3M$ or —COOM wherein M represents a hydrogen atom or a cation species derived from an alkali metal, ammonia or tri (hydroxy $C_{1-6}$ alkyl) amine, $R^2$ represents a carboxyalkyl group wherein the carboxy group may form a salt with an alkali metal or ammonia, a substituted or unsubstituted $C_{1-6}$ alkoxy $C_{1-6}$ alkyl group or a substituted or unsubstituted phenyl or $C_{1-6}$ alkanoyl group, and $R^3$, $R^4$ and $R^5$, which may be the same or different, each independently represent a hydrogen atom or —$SO_3M$ wherein M is as defined above.

3. An ink composition according to claim 1, wherein said dye represented by formula (I) is contained in an amount of 0.1 to 10% by weight.

4. An ink composition according to claim 1, wherein said C.I. Direct Yellow 86, 132 or 144 is contained in an amount of 0.001 to 0.5% by weight.

5. An ink composition according to claim 1, wherein said dye represented by formula (II) is contained in an amount of 0.001 to 0.5% by weight.

6. An ink composition according to claim 1, wherein said dye represented by formula (III) is contained in an amount of 0.005 to 0.5% by weight.

7. In a process for ink jet recording wherein a black ink is ejected onto a recording medium to form a print image thereon, the improvement comprising ejecting an ink composition onto the recording medium wherein the composition comprises a first dye represented by formula (I):

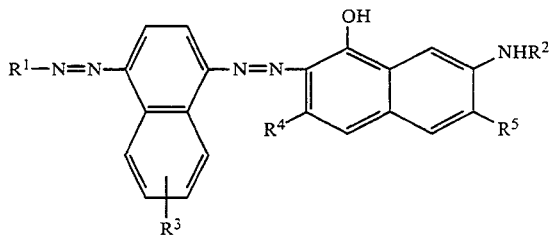

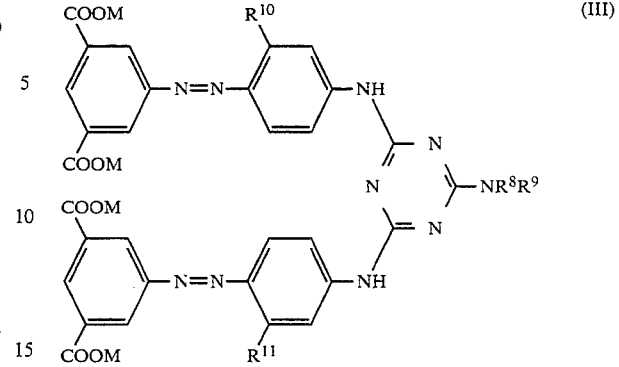

wherein

R¹ represents a phenyl or naphthyl group which may be substituted by a hydroxyl group, —NH₂, —SO₃M or —COOM wherein M represents a hydrogen atom or a cation species derived from an alkali metal, ammonia or an amine, R² represents a hydrogen, a carboxyalkyl group wherein the carboxy group may form a salt with an alkali metal or ammonia, a substituted or unsubstituted alkoxyalkyl group or a substituted or unsubstituted phenyl or alkanoyl group, and R³, R⁴ and R⁵, which may be the same or different, each independently represent a hydrogen atom or —SO₃M wherein M is as defined above, provided that R¹ does not represent a phenyl group substituted with —SO₃M when R³, R⁴ and R⁵ all represent —SO₃M;

and a second dye selected from the group consisting of C.I. Direct Yellow 86, 132 and 144 and compounds represented by formula (II):

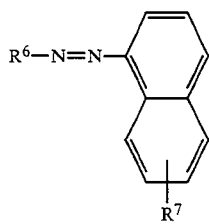

wherein

R⁶ represents a phenyl or naphthyl group which may be substituted by a hydroxyl group, —NH₂, —SO₃M or —COOM wherein M represents a hydrogen atom or a cation species derived from an alkali metal, ammonia or an amine, and R⁷ represents a hydrogen atom or —SO₃M wherein M is as defined above; or formula III:

wherein

R⁸ and R⁹, which may be the same or different, each independently represent a hydrogen atom, an alkyl group or a hydroxyalkyl group, provided that R⁸ and R⁹ do not simultaneously represent a hydrogen atom, and R¹⁰ and R¹¹, which may be the same or different, each independently represent a hydrogen atom, an alkyl group, a hydroxyalkyl group or an alkoxy group;

said first dye being present in the composition in an amount sufficient to enable the composition to form a print image having a black hue on a recording medium, said second dye being present in the composition in an amount sufficient to improve vividness of the black hue or sharpness of the image or both.

8. An ink composition according to claim 7, wherein in the dye represented by formula (I), R¹ represents a phenyl or naphthyl group which may be substituted by a hydroxyl group, —NH₂, —SO₃M or —COOM wherein M represents a hydrogen atom or a cation species derived from an alkali metal, ammonia or tri(hydroxy C₁₋₆ alkyl) amine, R² represents a carboxyalkyl group wherein the carboxy group may form a salt with an alkali metal or ammonia, a substituted or unsubstituted C₁₋₆ alkoxy C₁₋₆ alkyl group or a substituted or unsubstituted phenyl or C₁₋₆ alkanoyl group, and R³, R⁴ and R⁵, which may be the same or different, each independently represent a hydrogen atom or —SO₃M wherein M is as defined above.

9. An ink composition according to claim 7, wherein said dye represented by formula (I) is present in an amount of 0.1 to 10% by weight.

10. An ink composition according to claim 7, wherein said C.I. Direct Yellow 86, 132 or 144 is present in an amount of 0.001 to 0.5% by weight.

11. An ink composition according to claim 7, wherein said dye represented by formula (II) is present in an amount of 0.001 to 0.5% by weight.

12. An ink composition according to claim 7, wherein said dye represented by formula (III) is present in an amount of 0.005 to 0.5% by weight.

* * * * *